Figure 1:
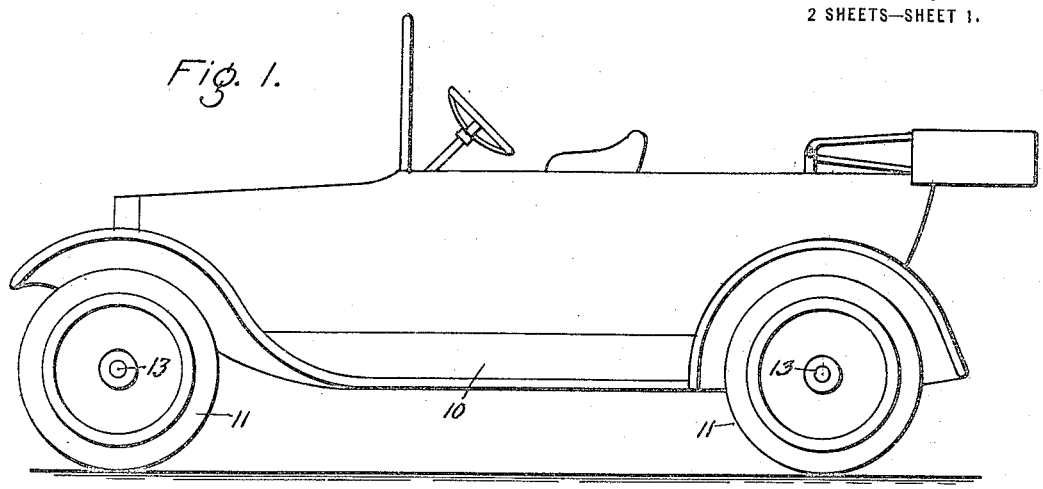
Figure 3:
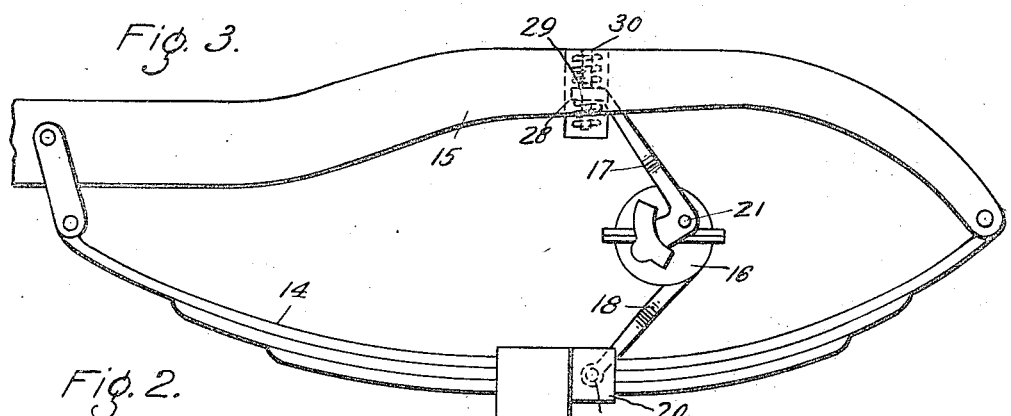
Figure 2:
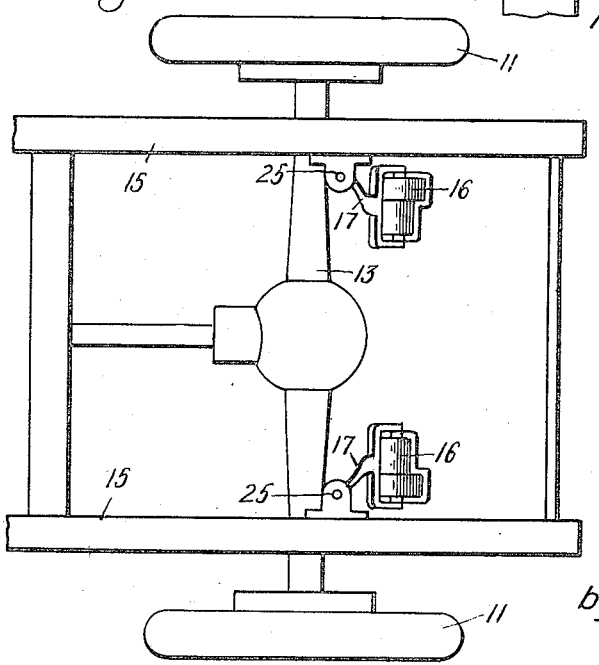
Figure 4:
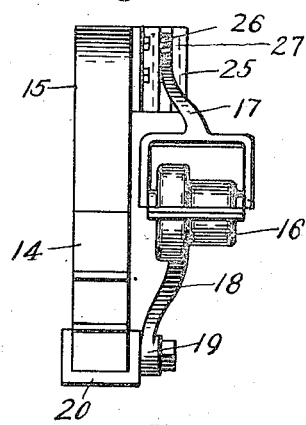

H. A. DANFORTH.
SHOCK ABSORBER.
APPLICATION FILED MAR. 20, 1916.

1,352,724.

Patented Sept. 14, 1920.
2 SHEETS—SHEET 1.

Inventor,
Harland A. Danforth,
by Frank G. Hattie
His Attorney.

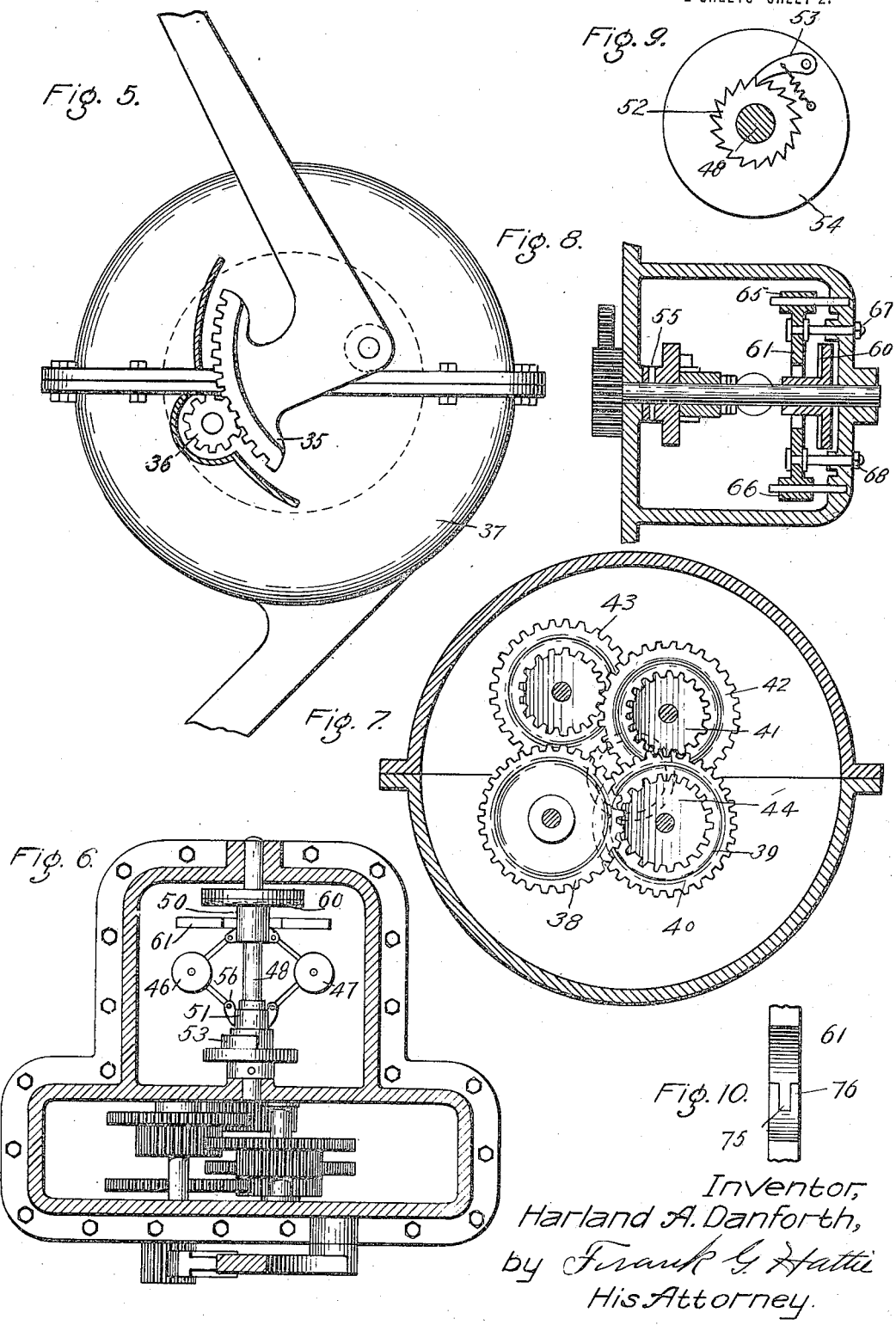

UNITED STATES PATENT OFFICE.

HARLAND A. DANFORTH, OF SAUGUS, MASSACHUSETTS.

SHOCK-ABSORBER.

1,352,724.             Specification of Letters Patent.    Patented Sept. 14, 1920.

Application filed March 20, 1916.  Serial No. 85,340.

*To all whom it may concern:*

Be it known that I, HARLAND A. DANFORTH, a citizen of the United States, residing at Saugus, in the county of Essex and State of Massachusetts, have invented certain new and useful Improvements in Shock-Absorbers, of which the following is a specification.

The invention relates to shock absorbers especially adapted for vehicles. It is designed particularly to construct a device of the nature where the unevenness of roads which occurs during the ordinary travel will be taken up by the spring of the vehicle to which the present invention is applied. The exceptional or violent shocks and the like are taken up by the shock absorber; the said shock absorber being so constructed that when the body of the vehicle is out of support of the springs a centrifugal device is so arranged that it is operated by the vibration of the vehicle for counteracting the force of the said vibration. This action allows the body of the vehicle to find its support on the springs without a violent shock, which otherwise would deliver a hammer blow and tend to destroy the spring and also injure other parts of the vehicle:

Referring to the figures,

Figure #1 is a side elevation of a vehicle.

Fig. #2 is a partial plan view of the chassis of a vehicle with the shock absorbers in position.

Fig. #3 is a side elevation of a vehicle spring with the shock absorber in position.

Fig. #4 is an end view of the same.

Fig. #5 is a side elevation of the shock absorber.

Fig. #6 is a horizontal section showing the operating gears of the shock absorber.

Fig. #7 is a vertical section of the shock absorber.

Fig. #8 is a section taken on the line 8—8 Fig. 6.

Fig. #9 is a section taken on the line 9—9 Fig. 6.

Fig. #10 is a fragmentary view of the stationary disk.

Referring to the drawings, 10 indicates a vehicle body having wheels 11. Connected to the wheels 11 are the axles 13 to which the supporting spring 14 is secured. The ends of the spring are pivotally connected to the chassis frame 15.

The embodiment of the invention lies in a shock absorber 16 which controls the vibration of the body of the vehicle by centrifugal force, and the construction is such as to control the downward movement of the car when it is most needed to prevent hammer blows of the vehicle body against the axle which weakens the springs and causes them to break. The shock absorber is connected to the frame 15 and spring 14 by the arms 17 and 18 respectively. The arm 18 is cast with the shock absorber casing 16 but is free to swing on the fulcrum 19 located on the bracket 20 which is secured to the spring 14. The arm 17 is pivotally secured, as indicated by 21, to the shock absorber 16. The opposite end of the arm 17 is flexibly secured to the frame 15 by a special device, which serves as a cushion and prevents the shock absorber from being violently wrenched under sudden strains by the increased vibration of the body of the vehicle. The device consists of a box 25 secured to the chassis frame by bolts. Formed in the box 25 is a slot 26 which permits the arm 17 to move up or down according to the conditions against the springs 27. The end of the arm 17 is enlarged as indicated by 28, and is provided with a hole 29 which is adapted to receive a pin 30 which also extends through and is held in position in the ends of the box. By this construction a limited movement of the vehicle body will be communicated to the shock absorber and the vibration will be taken up both by the shock absorber and the spring 14. When the vibration of the vehicle body becomes excessive, due to the uneven condition of the road over which the vehicle travels, the increased vibration of the vehicle body will be instantly communicated to the shock absorber, which will be controlled automatically according to the strength of vibration.

The arm 17 at its lower extremity is formed into a segmental gear 35 which meshes with a pinion gear 36. These gears are inclosed in a casing 37. The shock absorber casing is formed in two parts and held together by bolts. Located in the casing is a train of gears 38, 39, 40, 41, 42, 43 and 44. These gears are rotated by the pinion gear 36 and segmental gear 35. The latter is caused to rotate due to the changing distance between the chassis frame 15 and spring 14. That is, the arm 17 moves up and down as the distance changes which rotates the gears, and in turn rotate the centrifugal governor weights by a special designed construction.

The gear 44 is secured to the shaft 48 which has a bearing between the division line of the casing. This construction allows the mechanism to be assembled. The governor or speed responsive device is loosely mounted on the shaft 48. The speed responsive device consists of the weights 46 and 47 which are pivotally secured to the sleeves 50 and 51 by means of links. Formed on the sleeve 51 is a ratchet wheel 52 which coöperates with the ratchet 53 for rotating the speed responsive device at the period that the vibration is the most destructive. The ratchet is pivotally secured to the disk 54 which is rigidly secured to the shaft 48 by the pin 55. Although the sleeve 51 is loose on the shaft 48 it is held from axial movement by the collar 56 on one end and the disk 54 on the other. The collar 56 is secured to the shaft 48 by a pin.

The sleeve 50 is loose on the shaft 48 and is free to move axially. Formed on the sleeve 50 is a brake disk 60 which coöperates with the stationary disk 61 for increasing the effectiveness of the shock absorbing elements, and also prevents them from racing, that is, when the weights 46 and 47 are thrown outwardly by the centrifugal force, the disk 60 is drawn toward the disk 61 before the maximum power is expended, and acts as an auxiliary to the centrifugal device for increasing its effective resistance. The stationary disk is adjustable from the outside as shown in Fig. #8, and is also made in two parts to facilitate assembling. They are mounted on the studs which are threaded into the casing. The disk is provided with elongated hubs 65 and 66 which afford a strong support for holding them in position when the rotating disk is operating against them. The disk 61 is adjusted and held from axial movement by the pins 67 and 68. The pins are free to rotate in the disk and are held in position by collars on either side. The pins 67 and 68 are free to rotate to permit the said disk to be adjusted outside the casing. The pins are held in relation to the disk by collars. They are held in position by lock nuts. The disks are made in two parts, one of which is provided with a groove 75 and registers with a projection 76 formed on the other part. By this construction assembling is facilitated.

In operation, when the vehicle is traveling on a road and under normal conditions the vibrations are taken up by the springs where violent shocks are taken up by the shock absorber. When the wheels strike an obstruction they are raised and the vibration is first taken up by the springs until it travels such a distance that it passes the elastic limit of the said spring and the movement is imparted to the body of the vehicle. The momentum plus the distended condition of the spring forces the body upwardly thereby overpulling the spring in the opposite direction, which momentarily forces the body of the vehicle out of support, after which it falls downwardly, and the resultant forces produce a hammer blow against the axle which tends to destroy the springs.

To obviate this condition the shock absorber is so connected to the frame 15 and spring 14 that a counteracting force is put in motion which permits the body of the vehicle to settle down into support on the spring with the least possible amount of vibration. That is, if the velocity of the downward movement of the supporting member is at a maximum, the counteraction which is determined by this movement will be in proportion to the maximum or direct action of the body, and at all times the counteraction is available when it is most needed. For instance, if the distance decreases between the frame 15 and spring 14, the movement causing this change in distance forces the arm 17 downwardly which causes the segmental gear 55 to rotate, which in turn causes the speed responsive device, of which the weights 46 and 47 are the effective members, to rotate, and as the speed of the weight increases they are thrown outwardly which causes an increase of counteracting force at the period it is needed to bring the vibrating members into an equilibrium.

In detail operation the segmental gear 35 moves downwardly sufficiently to rotate the gear 36 one revolution. The movement of rotation is imparted to the gears 38, 39, 40, 41, 42, 43, 44 and shaft 48. As the disk 54 on which the ratchet is mounted is fast on the shaft it also rotates and causes the said ratchet to engage the ratchet wheel and impart a similar movement thereto as the ratchet wheel is part of the speed responsive device. It is obvious that the weights 46 and 47 are rotated in one direction only, and that it is in the direction for the direct weight of the downward moving body to be in time and proportion to the counteracting force and eliminate the destructive shocks and vibration caused by the unbalancing of the supporting and supported members.

To prevenet the weight from overspeeding, the disk is brought into frictional contact with the disk 61 by the outward movement of the weights 46 and 47. Any number of gears or any size weights can be used to obtain sufficient counteracting force to prevent vibration.

To prevent sudden strains on the centrifugal device, springs 27, located in the box 29 on either side the member 28 of the arm 17, are provided.

In accordance with the provisions of the patent statutes, I have described the principles of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. A shock absorber secured to a body and to a flexible support, comprising a centrifugal means operated by the vibrations of the body for counteracting the force of the vibration.

2. A shock absorber secured to a body and to a flexible support, comprising a centrifugal means operated by the vibrations of the body and an auxiliary means for retarding the speed of the said centrifugal means.

3. A shock absorber for vehicles secured to a spring and to a frame, comprising a centrifugal means operated by the vibration of the frame for counteracting the force of the vibration for the purpose specified.

4. A shock absorber for vehicles secured to a spring and to a frame, comprising a centrifugal means operated by the vibration of the frame for counteracting the force of the said vibration, and a second means for relieving sudden strains on the centrifugal means.

5. A shock absorber for vehicles secured to a spring and to a frame, comprising a casing, two arms, one rigid with the casing and the other pivotally secured to the said casing the opposite ends of the arms connected to the spring and the frame, and a centrifugal means in the casing operated by the vibrations of the frame for counteracting the force of the said vibration for the purpose specified.

6. A shock absorber for vehicles secured to a spring and to a frame, comprising a casing, two arms, one rigid with the casing and the other pivotally secured to the said casing, the opposite ends of the arms connected to the spring and the frame, a centrifugal means in the casing operated by the vibration of the frame for counteracting the force of the said vibration, and means connected to one of the arms for relieving sudden strains on the centrifugal means.

7. A shock absorber for vehicles secured to a spring and to a frame, comprising a casing, two arms, one rigid with the casing and the other pivotally secured to the said casing, the opposite ends of the arms connected to the spring and the casing, a centrifugal means in the casing operated by the vibrations of the frame for counteracting the force of the said vibration, a box on the frame, one of the arms extending into the box, springs in the box on either side of the arm for relieving sudden strains on the centrifugal means.

8. A shock absorber for vehicles, secured to a spring and to a frame, comprising a casing, two arms, one rigid with the casing and the other pivotally secured to the said casing, the opposite ends of arms connected to the spring and the frame, a gear on one of the arms, gears coöperating with gear on the arm, a centrifugal means driven by the gears which is operated by the vibration of the frame for counteracting the force of the said vibration for the purpose specified.

9. A shock absorber for vehicles secured to a spring and to a frame, comprising a casing, two arms, one rigid with the casing and the other pivotally secured to the said casing, the opposite ends of arms connected to the spring and the frame, a gear on one of the arms, gears coöperating with gear on the arm, a centrifugal means driven by the gears which is operated by the vibration of the frame for counteracting the force of the said vibration, and means for retarding the speed of the centrifugal device for the purpose specified.

10. A shock absorber for vehicles, secured to a spring and to a frame, comprising a casing, two arms, one rigid with the casing and the other pivotally secured to the said casing, the opposite ends of arms connected to the spring and the frame, a gear on one of the arms, gears coöperating with gear on the arm, a centrifugal means driven by the gears, which is operated by the vibration of the frame for counteracting the force of the said vibration, a disk operated by the centrifugal device, and a stationary disk secured to the casing for retarding the speed of the centrifugal device, for the purpose specified.

11. A shock absorber for vehicles, secured to a spring and a frame, comprising a casing, two arms, one rigid with the casing and the other pivotally secured to the said casing, the opposite ends of arms connected to the spring and the frame, a gear on one of the arms, gears coöperating with gear on the arm, a centrifugal means driven by the gears, which is operated by the vibration of the frame for counteracting the force of the said vibration, a disk operated by the centrifugal device, a stationary disk secured to the casing, and means for adjusting the stationary disk for the purpose specified.

12. A shock absorber for vehicles secured to a spring, and to a frame, comprising a casing, two arms, one rigid with the casing and the other pivotally secured to the said casing, the opposite ends of arms connected to the spring and the frame, a gear on one end of the arms, gears coöperating with a gear on the arm, a centrifugal means driven by the gears which is operated by the vibration of the frame for counteracting the force of the said vibration, a disk operated by the centrifugal device, a stationary disk secured to the casing, studs threaded in the casing on which the stationary disk is free to slide, and pins free to turn in the disk and threaded into and through the casing for adjusting the stationary disk for the purpose specified.

HARLAND A. DANFORTH.